United States Patent [19]

King

[11] Patent Number: 5,441,358
[45] Date of Patent: Aug. 15, 1995

[54] COUPLING AND METHOD OF MAKING THE SAME

[75] Inventor: Dennis M. King, Derby, England

[73] Assignee: Rolls-Royce plc, London, England

[21] Appl. No.: 39,195

[22] PCT Filed: Sep. 4, 1991

[86] PCT No.: PCT/GB91/01495
§ 371 Date: Apr. 14, 1993
§ 102(e) Date: Apr. 14, 1993

[87] PCT Pub. No.: WO92/09819
PCT Pub. Date: Nov. 6, 1992

[30] Foreign Application Priority Data

Nov. 29, 1990 [GB] United Kingdom ............ 9025988

[51] Int. Cl.⁶ .................................... B25G 3/00
[52] U.S. Cl. .................................... 403/30; 403/41; 403/335; 403/337
[58] Field of Search ............ 403/30, 41, 335, 337

[56] References Cited

U.S. PATENT DOCUMENTS

| | | | |
|---|---|---|---|
| 2,206,223 | 7/1940 | Dearborn | 403/335 |
| 2,303,032 | 11/1942 | Dusevoir . | |
| 2,738,210 | 3/1956 | Hjembo | 403/335 |
| 2,879,092 | 3/1959 | Hargrove et al. | 403/337 |
| 4,053,248 | 10/1977 | Schultenkamper et al. | 403/337 |
| 4,191,487 | 3/1980 | Schultenkamper | 403/337 |

FOREIGN PATENT DOCUMENTS

| | | | |
|---|---|---|---|
| 544223 | 1/1956 | Belgium | 403/337 |
| 0341455 | 11/1989 | European Pat. Off. . | |
| 2217589 | 9/1974 | France . | |
| 2715639 | 10/1978 | Germany | 403/337 |
| 3210389 | 4/1983 | Germany . | |
| 3237096 | 4/1984 | Germany . | |
| 8324152.3 | 10/1987 | Germany . | |
| 395497 | 7/1933 | United Kingdom . | |
| 824931 | 12/1959 | United Kingdom . | |
| 842244 | 7/1960 | United Kingdom . | |
| 1569698 | 6/1980 | United Kingdom . | |
| 2097734 | 11/1982 | United Kingdom . | |

Primary Examiner—Richard A. Bertsch
Assistant Examiner—Howard R. Richman
Attorney, Agent, or Firm—Cushman Darby & Cushman

[57] ABSTRACT

A shaft (12) is connected to a disc (20) by a coupling which comprises a spigot (14) which extends from the shaft (12) and locates in a recess (22) in the disc (20). At ambient temperature there is an interference fit between the spigot (14) and the recess (22) which maintains alignment of the disc (20) and the shaft (12) so that they rotate concentrically. At elevated temperatures the interference fit loosens and alignment of the disc (20) and the shaft (12) is maintained by a plurality of ridges (27) on the face (25) of a flange (24) on the disc (20). The ridges (27) have a large radial component and engage with the confronting face (17) of a flange (16) on the shaft (12) to prevent lateral movement between the shaft (12) and the disc (20).

4 Claims, 2 Drawing Sheets

COUPLING AND METHOD OF MAKING THE SAME

FIELD OF THE INVENTION

The present invention relates to a coupling, in particular to a coupling between confronting faces of two coaxial co-rotatable components, the confronting faces being radial with respect to the axis of the component, and to a method of making such a coupling.

BACKGROUND OF THE INVENTION

Couplings are known which enable two coaxial components to rotate together. In one such coupling, one of the components is provided with a spigot which locates in a recess formed in the other component to which it is to be joined. The spigot cooperates with the recess producing an interference fit which maintains the two components in alignment so they rotate coaxially. A problem with such a coupling is that the spigot and recess have to be machined within fine tolerances to produce an interference fit and maintain the two components in alignment. The manufacturing process to produce a coupling within the required tolerances is both time consuming and expensive.

With a coupling of this type, alignment problems may arise between the two components if the spigot and recess experience differential expansion. This may be as a result of the two components having different coefficients of thermal expansion or if one of the components experiences a different temperature to the other component. The interference fit loosens and misalignment occurs resulting in eccentric rotation of the components. The eccentric rotation of the components may result in vibration between the radial faces and produce uneven wear on these faces.

SUMMARY OF THE INVENTION

The present invention seeks to provide an improved coupling between the radial confronting faces of two coaxial co-rotatatable components in which eccentric rotation is substantially eliminated.

According to the present invention a coupling between confronting faces of two coaxial co-rotatable components, said confronting faces being radial with respect to the axis of the components is characterized in that the at least one of the radial confronting faces is provided with a plurality of closely spaced apart scored lines which define ridges, the ridges having a large radial component and engaging with the other radial confronting face to prevent lateral movement of the components relative to one another.

Preferably the at least one radial confronting face which is provided with the ridges is of harder material than the other radial confronting face with which the ridges engage.

The radial confronting faces of the two coaxial co-rotating components may have different coefficients of thermal expansion and they may experience different temperatures when in operation.

The ridges on the at least one radial confronting face are preferably produced by radial grinding and have a height of the order of 3.2 $\mu$m.

A method of joining confronting faces of two coaxial co-rotatable components, said confronting faces being radial with respect to the axis of the components comprises the steps of, machining a plurality of closely spaced apart scored lines to define ridges onto at least one of the radial confronting faces to be joined, urging the two radial confronting faces into abutting relationship so as to form an impression of the ridges in the other radial confronting face, characterized in that the plurality of ridges on each of the radial confronting faces have a large radial component and interengage so that lateral movement of the two components relative to one another is prevented.

The present invention will now be described by way of example and with reference to the accompanying drawings in which,

DETAILED DESCRIPTION OF THE INVENTION

Figure 1:
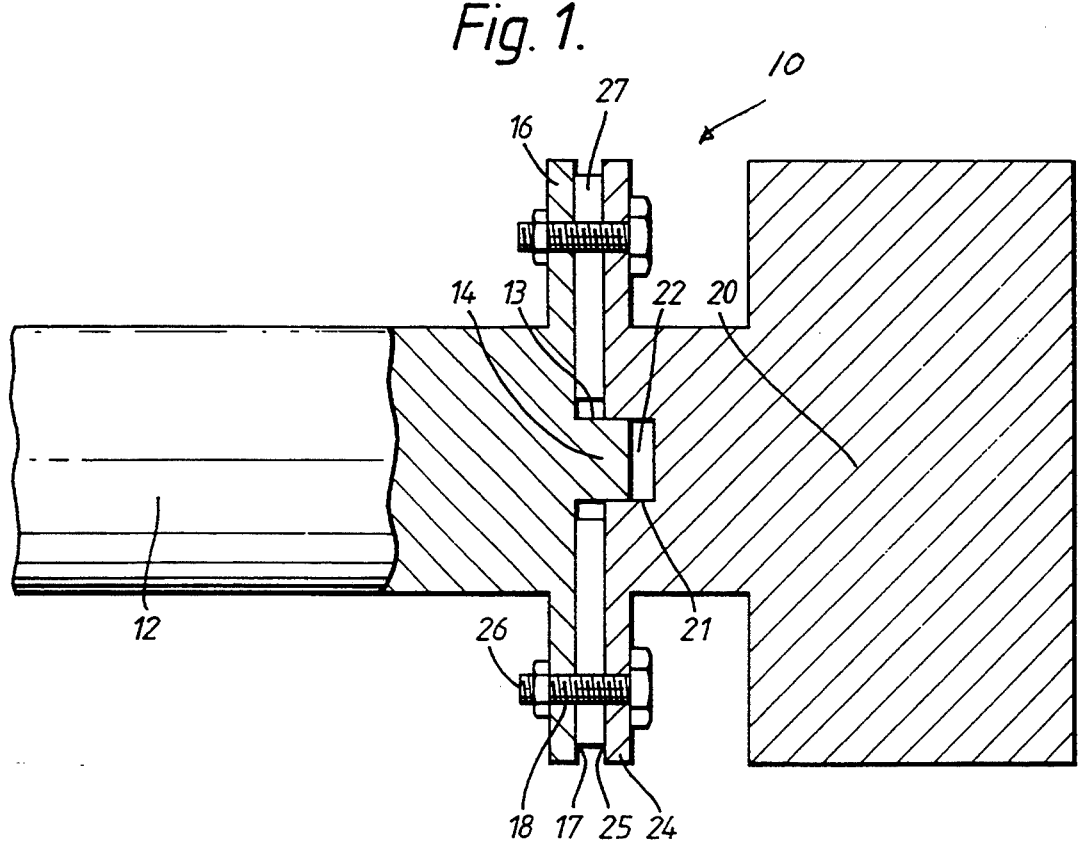
FIG. 1 is a cross-sectional view of a coupling, in accordance with the present invention, between radial confronting face of two coaxial co-rotatable components.

With reference to FIG. 1 a shaft 12 is connected to a further structure, such as a disc 20, by a coupling generally indicated at 10. The coupling 10 joins the disc 20 to the shaft 12 so that the disc 20 is driven by the shaft 12 and rotates coaxially therewith.

The coupling 10 comprises a cylindrical spigot 14 which extends from one end of the shaft 12. The spigot 14 is concentric with the shaft 12 and cooperates with a corresponding recess 22 in the disc 20. The spigot 14 on the shaft 12 and the recess in the disc 20 are machined within fine tolerances so that there is an interference fit between the outer circumferential face 13 of the spigot 14 and the cylindrical face 21 of the recess 22 when at ambient temperature.

The confronting faces of the shaft 12 and the disc 20 are further provided with flanges 16 and 24 respectively. The flanges 16 and 24 are provided with a plurality of holes 18 for receiving bolts 26 by which the disc 20 is fastened to the shaft 12.

Figure 2:
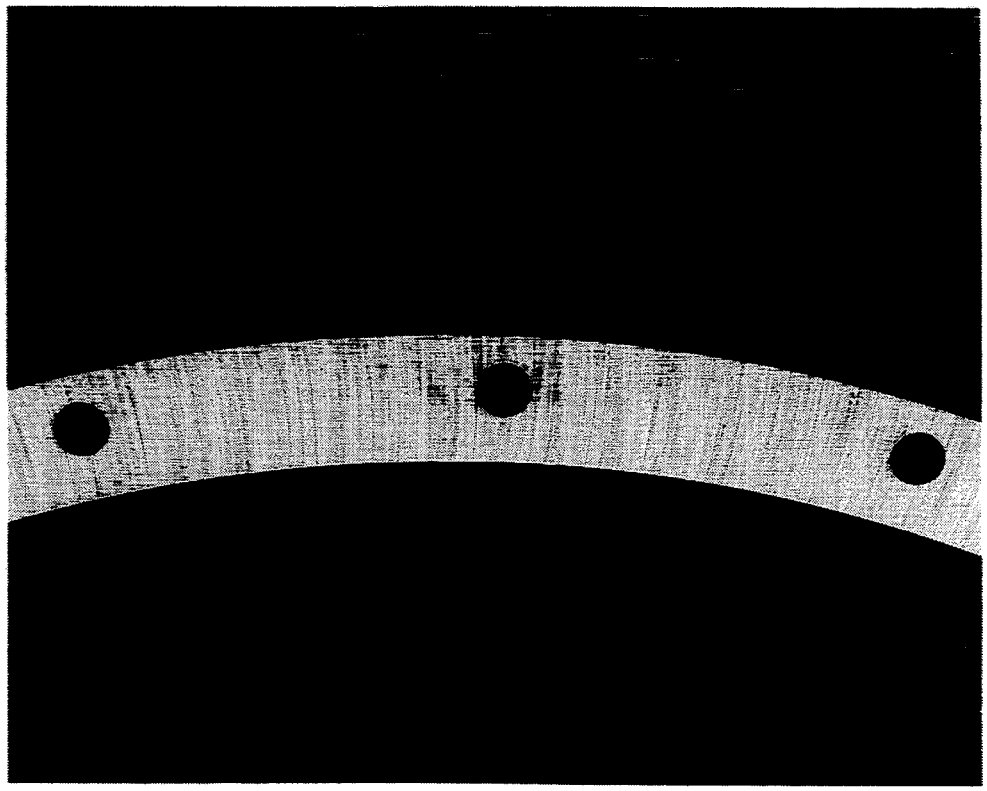
FIG. 2 is a photograph of one of the radial confronting faces of a coupling in accordance with the present invention.

The flange faces 17 and 25 are in abutment and have a plurality of closely spaced apart scored lines machined thereon which define ridges 27. The ridges 27 have a large radial component and have a height of the order of 3.2 $\mu$m. The height of the ridges 27 is determined by the surface finish required on the flange faces 17 and 25. FIG. 2 is a photograph of the ridges 27 on the flange 24 of the disc 20.

In operation the shaft 12 rotates and rotates the disc 20 coaxially therewith. The disc 20 operates at a higher temperature than the shaft 12 and differential expansion occurs between the two components. The recess 22 in the disc 20 expands loosening the interference fit with the spigot 14. As the interference fit loosens lateral movement occurs between the shaft 12 and the disc 20. The disc 20 tries to rotate eccentrically relative to the shaft 12. This eccentric movement is however prevented by the ridges 27 on the confronting faces 17 and 25 of the flanges 16 and 24 respectively. The ridges 27 mesh together to prevent any lateral movement between the shaft 12 and the disc 20. The ridges 27 do however allow movement in a direction substantially parallel to the ridges 27, in a radial direction, so that uniform thermal expansion of the disc 20 relative to the shaft 12 can be accommodated. In this way the shaft 12 and the disc 20 are encouraged to rotate concentrically at all temperatures but relative lateral movement is eliminated.

In the preferred embodiment of the present invention the flanges 16 and 24 are of dissimilar materials. The flange 24 on the disc 20 is of a harder material than the flange 16 on the shaft 12. A plurality of closely spaced apart scored lines are machined onto the flange face 25 of the disc 20, by radial grinding or any other suitable machining operation, to produce the ridges 27 thereon. The flange face 25 is then urged into abutment with the softer flange face 17 on the shaft 12. The ridges 27 on the flange face 25 leave an impression in the flange face 17 of the shaft 12. In this way the ridges formed on the flange face 17 of the shaft 12 correspond exactly to those on the flange face 25 and mesh together to prevent any lateral movement of the shaft 12 and the disc 20. The ridges 27 therefore need only be machined onto one of the confronting radial faces and it is not necessary to machine them to any great accuracy.

A further advantage of the present invention is that the spigot 14 and the recess 22 do not need to be machined to within such fine tolerances as any lateral movement between the two, caused by loosening of the interference fit is accommodated for by the provision of the ridges 27.

It will be appreciated by one skilled in the art that although the present invention has been described with reference to a coupling between the confronting faces of flanges on a shaft and a disc that it is equally applicable to any coupling between radial confronting faces of two coaxial co-rotatable components in which lateral movement is to be prevented.

I claim:

1. A coupling between confronting faces of two coaxial co-rotatable components, said components having a common axis of rotation, said confronting faces extending radially with respect to said common axis of said components, the radially confronting faces each being provided with a plurality of closely spaced scored lines, all of which extend radially relative to said axis of each component to define radial ridges, the radial ridges on one of the confronting faces engaging the ridges on the other confronting face to prevent lateral movement of the components relative to one another while allowing radial thermal expansion between said faces.

2. A coupling as claimed in claim 1 characterized in that one of the radial confronting faces is of harder material than the other radial confronting face.

3. A coupling as claimed in claim 1 or 2 characterized in that the radial confronting faces of the two coaxial co-rotatable components have different coefficients of thermal expansion.

4. A coupling as claimed in claim 1 characterized in that the ridges on the at least one radial confronting face have a height on the order of 3.2 $\mu$m.

* * * * *